(12) United States Patent
Chen

(10) Patent No.: US 7,614,741 B1
(45) Date of Patent: Nov. 10, 2009

(54) EYEGLASS FRAME AND ASSEMBLING MEANS THEREOF

(76) Inventor: Chien-Nan Chen, No. 632, Sec. 1, Qingsha St., Annan District, Tainan City (TW)

( * ) Notice: Subject to any disclaimer, the term of this patent is extended or adjusted under 35 U.S.C. 154(b) by 0 days.

(21) Appl. No.: 12/379,315

(22) Filed: Feb. 19, 2009

(51) Int. Cl.
*G02C 9/00* (2006.01)
(52) U.S. Cl. .......................... 351/47; 351/57
(58) Field of Classification Search ............... 351/47, 351/57, 48, 44, 158, 155
See application file for complete search history.

(56) References Cited

U.S. PATENT DOCUMENTS 3,741,634 A * 6/1973 Stoltze ................... 351/57
4,810,081 A * 3/1989 Mapelli et al. ............ 351/57

* cited by examiner

*Primary Examiner*—Hung X Dang
(74) *Attorney, Agent, or Firm*—Rosenberg, Klein & Lee

(57) ABSTRACT

An eyeglass frame and an assembling means thereof are disclosed. The assembling means of the eyeglass frame locks with a main body of the eyeglass frame. A connecting shaft with a plurality of locking teeth is arranged on the assembling means of the eyeglass frame and a wall of a receiving slot of an auxiliary eyeglass frame is also disposed with locking teeth so as to engage with and assemble with the connecting shaft of the assembling means of the eyeglass frame. Thereby the assembling way among the main body of the eyeglass frame, the auxiliary eyeglass frame, and the assembling means of the eyeglass frame is in a removable and detachable form. Moreover, mounting grooves for receiving removable lenses are set on the main body of the eyeglass frame and the auxiliary eyeglass frame respectively. Thus each component can be assembled and disassembled removably. Therefore, users can choose the components according to their needs to form eyeglass frames and production resources are used more efficiently.

5 Claims, 5 Drawing Sheets

EYEGLASS FRAME AND ASSEMBLING MEANS THEREOF

BACKGROUND OF THE INVENTION

1. Field of the Invention

The present invention relates to an eyeglass frame and an assembling means thereof, especially to an eyeglass frame in which the assembling among a main body of the eyeglass frame, an auxiliary eyeglass frame, and the assembling means of the eyeglass frame is in a removable and detachable form. Moreover, the main body of the eyeglass frame and the auxiliary eyeglass frame respectively are disposed with mounting grooves for receiving removable lenses. Thereby each component can be assembled and disassembled removably. Thus users can assemble the components they need to form eyeglass frames and production resources of eyeglass frames are used more efficiently.

2. Brief Description of the Prior Art

In order to protect eyes from harmful UV light, people always wear sunglasses for blocking UV rays while in outdoors. Along with the popularity of televisions and computers, the ratio of short sighted people to total population increases gradually year after year. Thus there are more and more people need to wear glasses for correcting people's vision. However, the prescription sunglasses are quite expensive. Thus the prescription eyeglasses is added with a sunglasses that blocks UV rays, as disclosed in Taiwanese Publication No. M334340-eyeglass attached with second lens. In this prior art, a main body of the eyeglass frame is fastened with a first lens. A receiving seat is disposed projectingly on right and left sides of upper edges of the main body of the eyeglass frame while a chamfered receiving slot is arranged on the receiving seat. The eyeglass further includes a second lens. A columnar pivoting rod is arranged on the second lens, corresponding to the receiving slot of the main body of the eyeglass frame so as to connect the second lens with the main body of the eyeglass frame. The second lens can be lifted and received toward the main body of the eyeglass frame.

Yet in practice, it is found that the above prior art has following shortcomings:

1. The main body of the eyeglass frame available now is projectingly disposed with receiving seats on right and left sides of upper edges. In such design, when the second lens is not used and is disassembled, the two projecting receiving seats on the main body of the eyeglass frame look weird and have negative effects on the appearance of the main body of the eyeglass frame.

2. The receiving slot on the receiving seat of the main body of the eyeglass frame available now is chamfered while the pivoting rod arranged on the second lens and corresponding to the receiving slot is designed in a columnar shape. Thus the second lens is lifted and received toward the main body of the eyeglass frame. However, by the design of the column and the chamfered slot, the lifting and receiving of the second lens are not smooth. Under the restriction of the columnar shape, the second lens can be lifted up only to a certain angle. Moreover, after being used for a period of time, the columnar pivoting rod and the chamfered receiving slot are easy to get worn-out and become flat. Thus the locating effect is weakened or disappears.

3. The second lens and the side eyeglass frame with columnar pivoting rod are produced by integrated injection molding. Thus the second lens itself can not be replaced. Moreover, while manufacturing, both the second lens and the side eyeglass frame with columnar pivoting rod are formed by injection molding at the same time and this leads to waste of production resources.

Furthermore, refer to Taiwanese Pub. App. No. M347580-eyeglass assembly, the eyeglass assembly includes a main frame and an auxiliary frame. The main frame consists of a bridge connection member with a slot on a top side thereof. The auxiliary frame includes a detachable locking member that locks with the bridge connection member and a liftable lens unit assembled with the locking member. The locking member further includes an against wall that leans against the top side of the bridge connection member, two lugs extended upward from right and left sides of a top surface of the against wall, and an elastic against block extended upward from the top surface of the against wall and with flexible elasticity. The lens unit is disposed with a location block that is rotatably assembled between the lugs and is leaning against the elastic against block. The location block is composed of a covering against surface on the bottom side, a lifting against surface on the top side and a horizontal shielding surface on the back side thereof.

Thereby when the lens unit is at a covered position, the covering against surface of the location block is against and located on the top side of the elastic against block. Now the lens unit attaches on the main frame and the angle therebetween is zero. Moreover, when the lens unit is lifted to a lifted position, the lifting against surface of the location block is against and located on the top side of the elastic against block. Now the lens unit is lifted while the angle between the lens unit and the main frame is 90 degrees. Furthermore, when lens unit is rotated to a horizontal shielding position, the horizontal shielding surface of the location block is against and located on the top side of the elastic against block. Now the lens unit is lifted completely and the angle between the lens unit and the main frame is 180 degrees.

According to above description, it is learned that the lens unit in the Taiwanese Pub. App. No. M347580-eyeglass assembly can be adjusted only at three stages—at 0, 90, 180 degrees. However, the light emitting angle and light conditions of the sun changes along with the time. The eyeglass assembly with 3-stage adjustment can't be lifted to a proper angle according to the change of light angle and intensity at different time for blocking the harmful sunlight directly onto eyes and allowing a certain amount of light into eyes to see properly.

In order to overcome shortcomings of above two prior arts, there is a need to create a new eyeglass frame with higher practical value.

SUMMARY OF THE INVENTION

Therefore it is a primary object of the present invention to provide an eyeglass frame and an assembling means of the eyeglass frame. The assembling means of the eyeglass frame is convenient to assemble and connect a main body of the eyeglass frame with an auxiliary eyeglass frame. The assembling way among the main body of the eyeglass frame, the auxiliary eyeglass frame, and the assembling means of the eyeglass frame is designed in a removable and detachable form so that users can assemble the components they need to form eyeglass frames. And production resources of eyeglass frames are used more efficiently.

In order to achieve the above object, the eyeglass frame of the present invention includes a main body of the eyeglass frame, an auxiliary eyeglass frame and an assembling means of the eyeglass frame.

The main body of the eyeglass frame includes two lens assembling and support parts, a connection part disposed between the lens assembling and support parts, and a mounting groove formed on an inner edge of the lens assembling and support part.

The auxiliary eyeglass frame corresponding to the main body of eyeglass frame consist of two lens assembling and support parts, a connection part arranged between the lens assembling and support parts, a mounting groove formed on an inner edge of the lens assembling and support part, and a connection block extended from and connected with a back side of the connection part. A receiving slot with an opening is formed on the connection block while a plurality of locking teeth is arranged on a wall of the receiving slot.

The assembling means of the eyeglass frame is composed of a main body of the assembling means of the eyeglass frame in which an upper side and a lower side extend backward to form locking pieces. The lower locking piece extends far more than the upper locking piece to form a locking part that correspondingly locks with the connection part of the main body of the eyeglass frame. Moreover, a connecting shaft is arranged on the assembling means of the eyeglass frame and a plurality of locking teeth is disposed on the connecting shaft so as to engage and assemble with the locking teeth on the receiving slot of the auxiliary eyeglass frame.

Thereby, the assembling way among the main body of the eyeglass frame, the auxiliary eyeglass frame, and the assembling means of the eyeglass frame is removable and detachable. Moreover, the main body of the eyeglass frame and the auxiliary eyeglass frame are set with mounting grooves for receiving removable optical lens. Thus each component can be assembled and disassembled removably. People can use components they need to form the eyeglass frame easily and production resources of eyeglass frames are used more efficiently.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
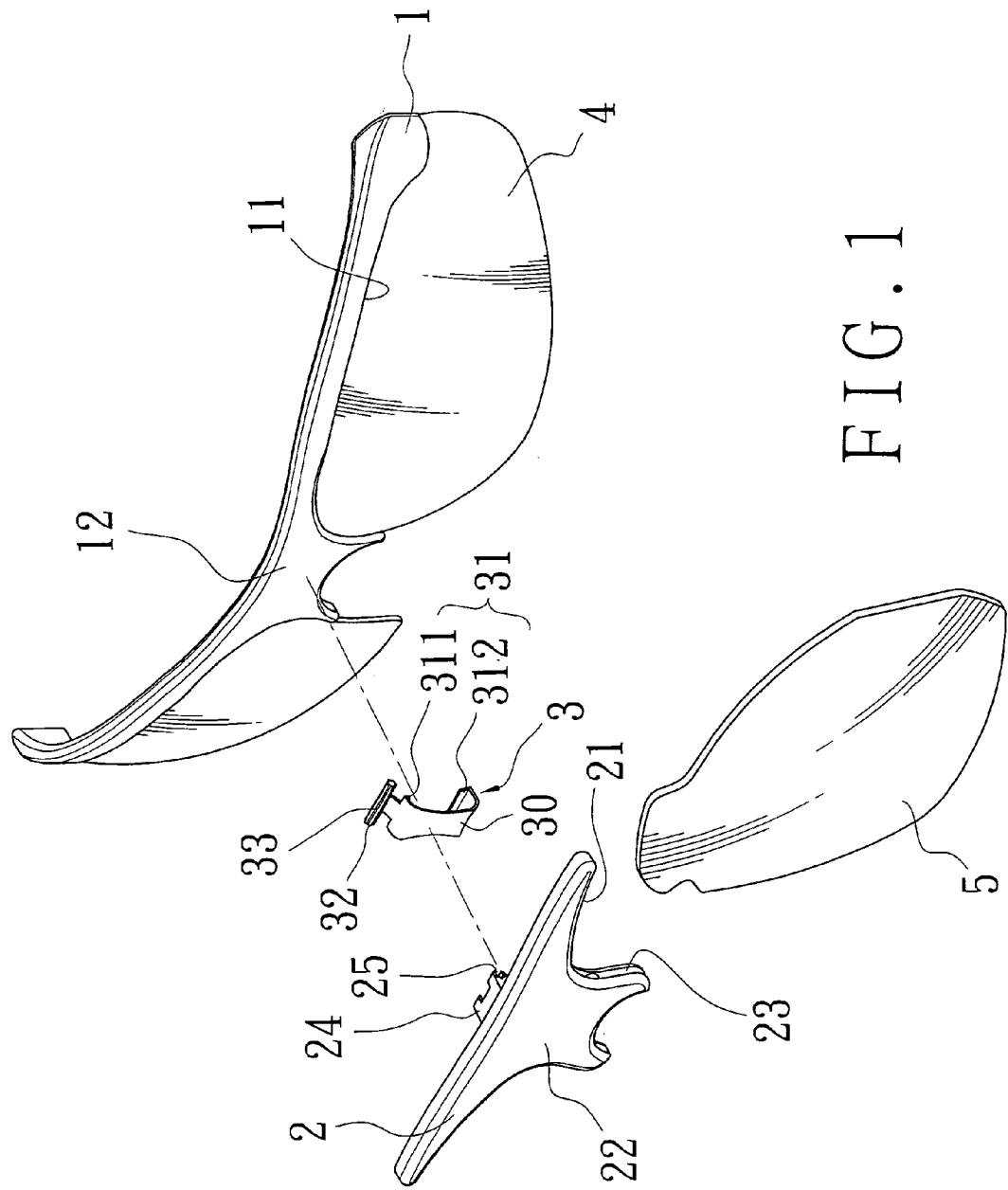
FIG. 1 is an explosive view of an embodiment according to the present invention.
Figure 2:
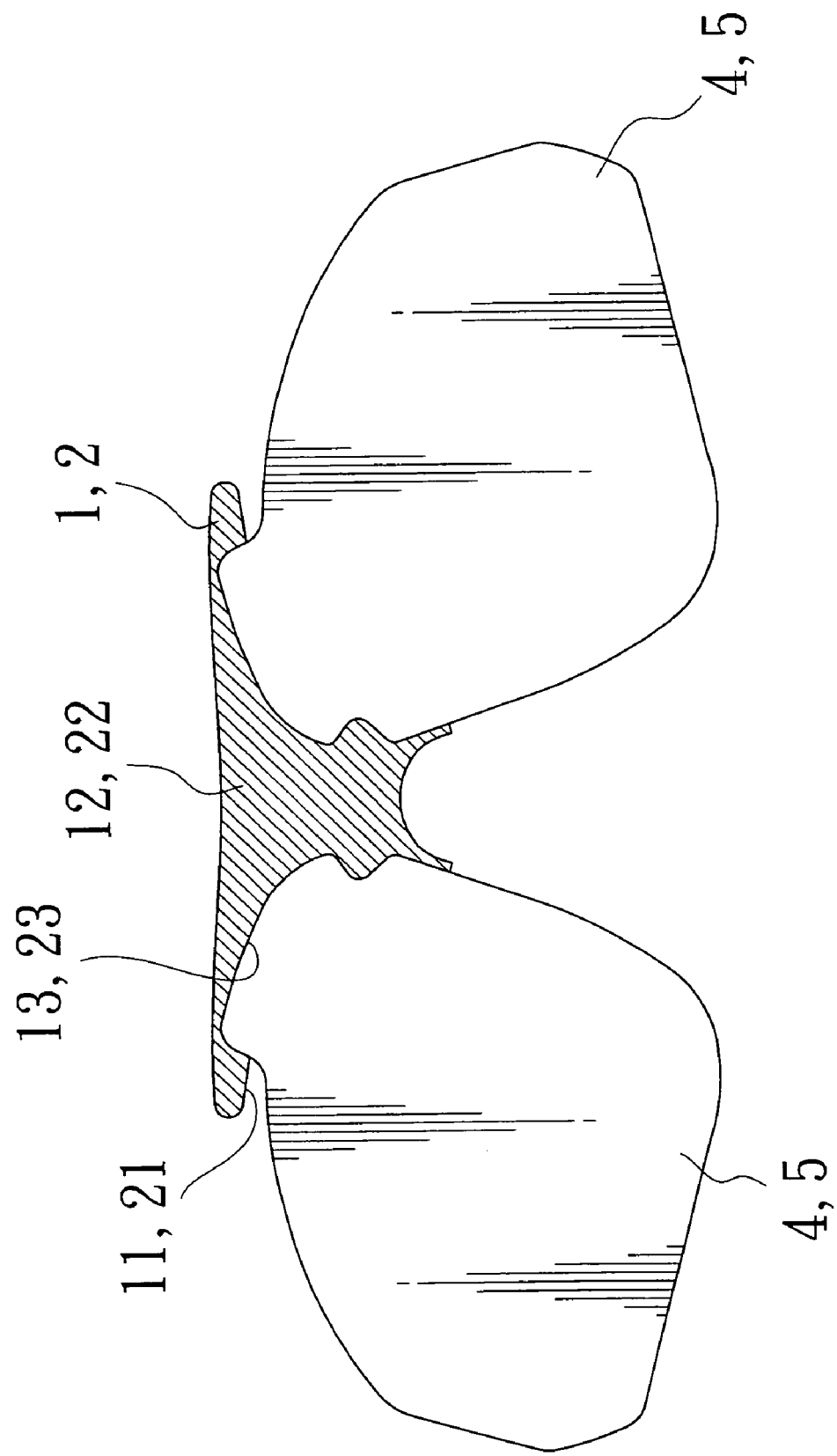
FIG. 2 is a front view of a cross section of the embodiment according to the present invention.

Refer to FIG. 1 & FIG. 2, an eyeglass frame assembly and assembling parts thereof according to the present invention includes a main body of the eyeglass frame (1), an auxiliary eyeglass frame (2) and an assembling means of the eyeglass frame (3).

The main body of the eyeglass frame (1) consists of a connection part (12) disposed between two lens assembling and support parts (11) and a mounting groove (13) formed on an inner edge of the lens assembling and support part (11) for loading an optical lens (4).

Figure 3:
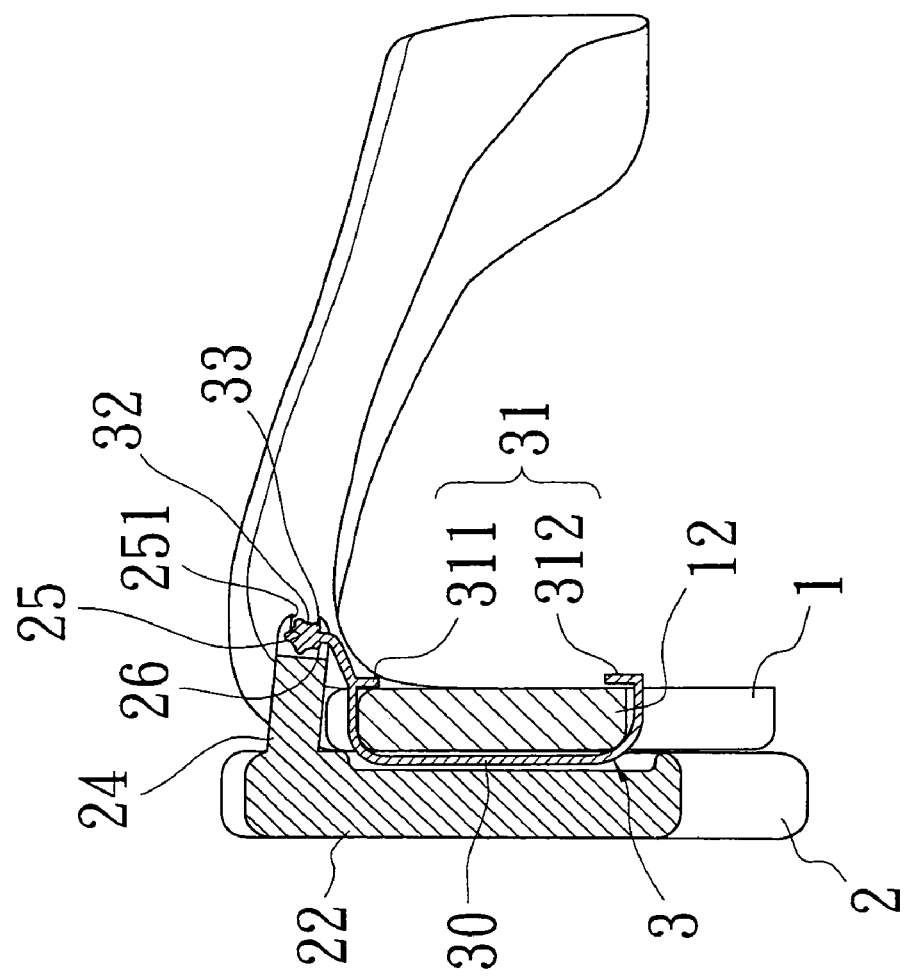
FIG. 3 is a side view of a cross section of the embodiment according to the present invention.

With reference of FIG. 3, the auxiliary eyeglass frame (2) arranged corresponding to the main body of eyeglass frame (1) includes two lens assembling and support parts (21), and a connection part (22) arranged between the lens assembling and support parts (21). Moreover, a mounting groove (23) is formed on an inner edge of the lens assembling and support part (21) for loading an anti-UV (ultraviolet) lens (5). And a connection block (24) extended from a back side of the connection part (22). A receiving slot (25) with an opening (251) is formed on the connection block (24) while a plurality of locking teeth (26) are arranged on a wall of the receiving slot (25).

The assembling means of the eyeglass frame (3) is composed of a curved main body of the assembling means (30) whose upper side and lower side extend backward to form locking pieces (311), (312). The lower locking piece (312) extends far more than the upper locking piece (311) so as to form a locking part (31) that correspondingly locks with the connection part (12) of the main body (1) of the eyeglass frame. Furthermore, a connecting shaft (32) is arranged on the assembling means of the eyeglass frame (3) and a plurality of locking teeth (33) is disposed on the connecting shaft (32) so as to engage and assemble with the locking teeth (26) on the receiving slot (25) of the auxiliary eyeglass frame (2).

Thereby, the main body of the eyeglass frame (1) is disposed with the optical lens (4) in common use, as shown in FIG. 1 & FIG. 2. Thus people with poor vision get the eyeglasses for correcting their eyesight so as to read or write.

Moreover, in order to protect eyes from potentially harmful UV rays, the auxiliary eyeglass frame (2) is assembled with the main body of the eyeglass frame (1) so that the harmful UV rays are blocked by the anti-UV lens (5) mounted on the auxiliary eyeglass frame (2) when people want to go out.

Figure 4:
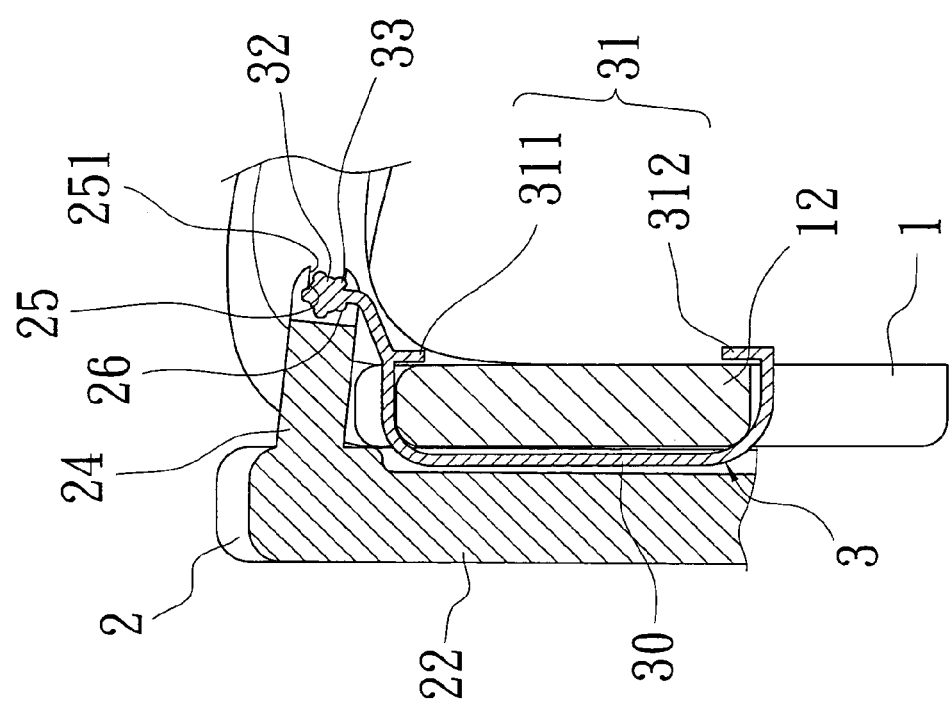
FIG. 4 is a partial enlarged view of the cross sectional view of the embodiment according to the present invention.
Figure 5:
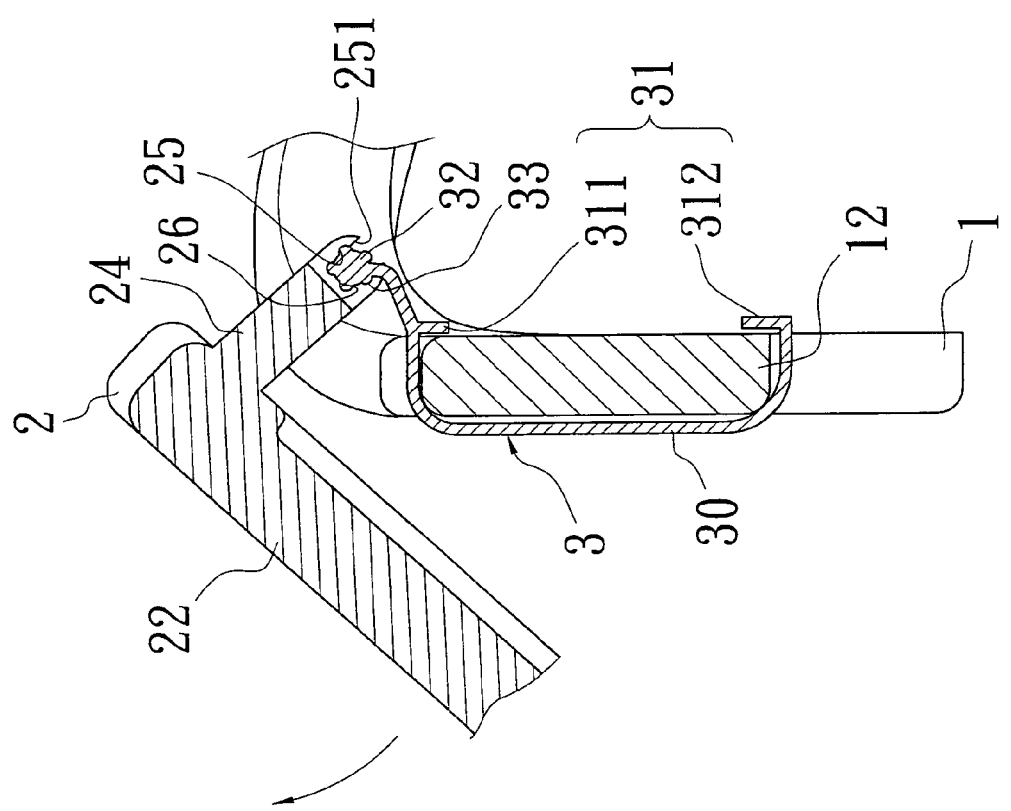
FIG. 5 shows a use status of the embodiment according to the present invention.

Refer to FIG. 4 & FIG. 5, the assembling means of the eyeglass frame (3) is fastened on the main body of the eyeglass frame (1) by the locking part (31) locks with the connection part (12) of the main body (1) and then the receiving slot (25) formed on the connection block (24) of the auxiliary eyeglass frame (2) is assembled with the connecting shaft (32) of the assembling means of the eyeglass frame (3). By the engagement between the locking teeth (26) arranged on the receiving slot (25) and the locking teeth (33) disposed on the connecting shaft (32), the auxiliary eyeglass frame (2) can be lifted stably and located to the position not obstructing the view of users. In this embodiment, the auxiliary eyeglass frame (2) is able to be lifted 180 degrees. Within 180 degrees, there are five stages of adjustment. In accordance with emitting angle of sunlight and light conditions of the sun, the auxiliary eyeglass frame (2) is lifted to a certain angle so that part of sunlight directly emits onto users' eyes is blocked while a certain amount of light that eyes need to see properly passes.

Furthermore, when users want to wear the main body of the eyeglass frame (1) only, both the assembling means of the eyeglass frame (3) and the auxiliary eyeglass frame (2) are disassembled from the main body of the eyeglass frame (1) since the assembling means of the eyeglass frame (3) and the auxiliary eyeglass frame (2) are removable and detachable from the main body of the eyeglass frame (1). Thus the main body of the eyeglass frame (1) gets a streamlined look. In addition, the lens assembling and support parts (11), (21) respectively on the main body of the eyeglass frame (1) and the auxiliary eyeglass frame (2) are designed with mounting grooves (13), (23) for receiving removable optical lens (4) or the anti-UV lens (5), as shown in FIG. 2. Thus when users want to choose the eyeglass style for special occasions or styling design, the styles and colors of the main body of the eyeglass frame (1) and the auxiliary eyeglass frame (2) can be changed so as to show great taste and fashion style of the users. In addition, while producing the eyeglass frames, each component is manufactured respectively and then to be integrated into one piece. Thus the repeated production of components can be avoided and production resources are used more efficiently.

In accordance with the above embodiments, it is learned that the present invention has the following advantages:

1. The assembling way among the main body of the eyeglass frame, the auxiliary eyeglass frame, and the assembling means of the eyeglass frame is designed in a removable and detachable form. Thus users can easily remove the assembling means of the eyeglass frame as well as the auxiliary eyeglass frame from the main body of the eyeglass frame. Therefore, the main body of the eyeglass frame is in a streamlined style.

2. The assembling means of the eyeglass frame is assembled with the auxiliary eyeglass frame by the engagement of the locking teeth. According to such design, the locking teeth are difficult to get worn-out and the auxiliary eyeglass frame is lifted more smoothly. Moreover, the auxiliary eyeglass frame can be lifted and located to a specific angle according to users' needs so as to ensure that users' vision will not be obstructed.

3. The assembling among the main body of the eyeglass frame, the auxiliary eyeglass frame, and the assembling means of the eyeglass frame is in removable and detachable. And the mounting groove are formed on the lens assembling and support parts of the main body of the eyeglass frame as well as the auxiliary eyeglass frame so that each component is removable and detachable. Thus users can assemble the components according to their needs. While producing the eyeglass frames, each component is manufactured respectively and production resources are used more efficiently.

4. In an embodiment of the present invention, the auxiliary eyeglass frame has at least five-stage adjustment within the range of 180 degrees so as to be lifted to a proper angle according to change of light emitting angle and light intensity at different time intervals. Thus the sunlight directly emitted onto eyes is blocked while a certain amount of light is allowed to enter into eyes to see properly.

In summary, an embodiment of the present invention has the effects expected. Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An assembling means of an eyeglass frame disposed on a main body of the eyeglass frame comprising: a main body of the assembling means of the eyeglass frame whose upper side and lower side extend backward to form locking pieces while the locking piece on the lower side extends far more than the locking piece on the upper side to form a locking part, and a connecting shaft with a plurality of locking teeth arranged on the main body of the assembling means of the eyeglass frame.

2. An eyeglass frame comprising a main body of the eyeglass frame, an auxiliary eyeglass frame and an assembling means of the eyeglass frame, wherein the main body of the eyeglass frame includes two lens assembling and support parts, and a connection part disposed between the lens assembling and support parts;

the auxiliary eyeglass frame is corresponding to the main body of eyeglass frame and having two lens assembling and support parts, a connection part arranged between the lens assembling and support parts, a mounting groove formed on an inner edge of the lens assembling and support part, and a connection block extended from and connected with a back side of the connection part; a receiving slot with an opening is mounted on the connection block and a plurality of locking teeth is arranged on a wall of the receiving slot;

the assembling means of the eyeglass frame includes a main body of the assembling means of the eyeglass frame in which an upper side and a lower side extend backward to form locking pieces while the locking piece on the lower side extends far more than the locking piece on the upper side to form a locking part correspondingly locking with the connection part of the main body of the eyeglass frame; a connecting shaft is arranged on the assembling means of the eyeglass frame and a plurality of locking teeth is disposed on the connecting shaft so as to engage and assemble with the locking teeth on the receiving slot of the auxiliary eyeglass frame.

3. The device as claimed in claim 2, wherein a mounting groove is formed on an inner edge of the lens assembling and support part of the main body of the eyeglass frame.

4. The device as claimed in claim 2, wherein the auxiliary eyeglass frame is lifted to 180 degrees.

5. The device as claimed in claim 2, wherein the auxiliary eyeglass frame is adjusted in at least five stages.

* * * * *